United States Patent [19]

Marie

[11] 3,939,129

[45] Feb. 17, 1976

[54] PROCESS FOR THE PREPARATION OF RANDOM COPOLYMERS OF MONO-OLEFINS OR OF MONO-OLEFINS AND UNCONJUGATED DIENES WITH LACTAMS WITH SUBSTITUTION ON THE NITROGEN ATOM BY AN UNSATURATED RADICAL

[75] Inventor: Gilbert Marie, Pau, France

[73] Assignee: Societe Nationale des Petroles d'Aquitaine, Courbevoie, France

[22] Filed: Apr. 11, 1974

[21] Appl. No.: 460,078

[30] Foreign Application Priority Data

Apr. 12, 1973 France .............................. 73.13309

[52] U.S. Cl...... 260/79.7; 260/33.6 UA; 260/42.29; 260/80.72; 428/461; 428/462
[51] Int. Cl.² . C08F 210/00; C08F 4/06; C08F 4/42
[58] Field of Search...................... 260/79.7, 80.72; 450/725.5; 428/461, 462

[56] References Cited

UNITED STATES PATENTS 3,821,172   6/1974   Sugiura et al.................. 260/78.5 R Primary Examiner—Stanford M. Levin
Attorney, Agent, or Firm—Burgess Ryan and Wayne

[57] ABSTRACT

A process is described for the preparation of substantially linear, amorphous random copolymers of mono-olefins or mono-olefins and unconjugated dienes with N-unsaturated lactams.

At least two mono-olefins containing 2 to 20 carbon atoms, and possibly an unconjugated diene, are placed in contact, in an inert liquid medium at a temperature of between −80° and +150°C, with at least one such N-unsaturated lactam in the form of a complex with a Lewis acid, in the presence of a co-ordination catalyst system, until a copolymer forms.

The resulting copolymers can be vulcanized, and among other properties have improved adherence to metal surfaces.

26 Claims, No Drawings

PROCESS FOR THE PREPARATION OF RANDOM COPOLYMERS OF MONO-OLEFINS OR OF MONO-OLEFINS AND UNCONJUGATED DIENES WITH LACTAMS WITH SUBSTITUTION ON THE NITROGEN ATOM BY AN UNSATURATED RADICAL

This invention concern a process for the preparation of new random copolymers, substantially linear and amorphous, of mono-olefins, particularly alpha-olefins, or mono-olefins and non-conjugated dienes, with lactams with substitution on the nitrogen atom by an unsaturated hydrocarbon radical. It also concerns the new copolymers thereby obtained, and elastomers produced by vulcanizing these copolymers.

Amorphous copolymers of mono-olefins, particularly ethylene and propylene, or mono-olefins and unconjugated dienes, such as ethylene, propylene and dicyclopentadiene or ethylidenenorbornene, are known in the existing art, and they are prepared by polymerization techniques using co-ordination catalysis, involving catalysts formed by the combination of compounds of transition metals in columns IV to VIII of the periodic table of elements with organometallic compounds of elements in columns I to III of this table. These amorphous copolymers can be vulcanized to produce elastomers with good mechanical properties, notably tensile strength and elasticity, and which can accordingly be used to make objects which must combine flexibility with mechanical strength, such as conveyor belts, pipes for industrial purposes and sealing rings.

It has been suggested that certain properties of these copolymers could be improved by incorporating therein relatively small quantities of groups from unsaturated polar derivatives, particularly unsaturated amines or unsaturated carboxylic acids, in their chains. This is done by copolymerizing the unsaturated polar derivatives with mono-olefins, and possibly non-conjugated dienes, using co-ordination catalysis techniques for the preparation of amorphous copolymers of mono-olefins or mono-olefins and unconjugated dienes.

These unsaturated polar derivatives, which show varying degrees of polarity, react with varying degrees of intensity to the components of the co-ordination catalyst, particularly the organometallic compounds, thereby inhibiting copolymerization. Because of this, certain polar monomers, which could have brought about improvements in certain properties of amorphous copolymers of mono-olefins or mono-olefins and unconjugated dienes cannot be incorporated in the chains of these copolymers.

Research that led to the present invention showed that the incorporation of lactam-derived groups in the chains of amorphous copolymers of mono-olefins, or mono-olefins and unconjugated dienes, among other things improved the adherence of such copolymers on various substrates. These new copolymers are obtained by a process involving co-ordination catalysis but which overcomes the drawbacks already mentioned, through the presence of the polar monomer in the polymerization medium containing the co-ordination catalyst.

This new process for the preparation of substantially linear amorphous, random copolymers of mono-olefins, or mono-olefins and unconjugated dienes, with lactams with the general formula:

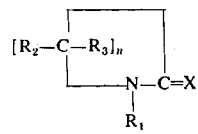

where $R_1$ is a monovalent alkenyl radical containing 2 to 8 carbon atoms, $R_2$ and $R_3$, which are identical or different, represent hydrogen or a monovalent hydrocarbon radical, free of ethylenic unsaturation and containing 1 to 8 carbon atoms, X represents oxygen or sulphur, and n is an integer ranging from 3 to 14, is characterized by the fact that at least two mono-olefins containing from 2 to 20 carbon atoms in their molecule, and possibly an unconjugated diene, are placed in contact, in an inert liquid medium at a temperature of between −80° and +150°C, with at least one of these lactams in the form of a complex with a Lewis acid, and in the presence of a catalyst system formed by the combination of an organometallic compound of at least one element in columns I, II or III of the periodic table of elements with a compound of a transition metal in columns IV to VIII of the periodic table, until a copolymer forms.

Suitable mono-olefins for use in this new process are alpha-olefins with the formula $R—CH = CH_2 = CH_2$, where R is hydrogen or an alkyl radical containing 1 to 18 carbon atoms, such as ethylene, propylene, 1-butene, 1-pentene, 4-methyl 1-pentene, 1-hexene, 1-octene and 1-hexadecene, and ethylene is preferably used in combination with an alpha-olefin containing 3 to 8 carbon atoms, and particularly with propylene or 1-butene.

Unconjugated dienes used in this new process can be linear or cyclic, and comprise in particular 1,4-hexadiene, 2-methyl-1,4-pentadiene, 1,4-cyclopentadiene, 1,5-cyclooctadiene, 4,7,8,9-tetrahydroindene, [3,2,0]-bicyclo-2,6-heptadiene, and norbornene derivatives such as dicyclopentadiene, and 5-alkylidene-2-norbornenes such as 5-methylene-2-norbornene and 5-ethylidene-2-norbornene.

N-unsaturated lactams that can be polymerized in this new process with mono-olefins, or mono-olefins and unconjugated dienes, and which are represented by the formula given above, contain from 4 to 15 nuclear carbon atoms ($n = 3$ to 14), and preferably 4 to 13 nuclear carbon atoms ($n = 3$ to 12), these nuclear carbon atoms optionally bearing monovalent hydrocarbon substitutions, free of ethylenic unsaturation, and containing 1 to 8 carbon atoms, and preferably radicals such as phenyl or alkyls containing 1 to 6 carbon atoms, such as methyl or ethyl. These N-unsaturated lactams include, among others, N-vinylpyrrolidone, N-vinyl-5-methyl pyrrolidone, N-vinyl-3-methyl pyrrolidone, N-vinyl-5-ethyl pyrrolidone, N-vinyl-5,5-dimethyl pyrrolidone, N-vinyl-5-phenyl pyrrolidone, N-allylpyrrolidone, N-vinylthiopyrrolidone, N-vinylpiperidone, N-vinyl-6,6-diethyl piperidone, N-vinyl caprolactam, N-vinyl-7-methyl caprolactam, N-vinyl-7-ethyl caprolactam, N-vinyl-7,7-dimethyl caprolactam, N-vinylthiocaprolactam, N-allylcaprolactam and N-vinylcapryllactam.

The resulting copolymers are amorphous and substantially linear, and their molecular weight of at least 5,000 is high enough to remain solid at ordinary temperatures. They can be vulcanized by means of free-radical generators such as peroxides, or by sulphur vulcanization systems when they contain groups derived from an unconjugated diene. The presence in such copolymers of heterocyclic radicals of the lactam type gives them good adherence to metals, after vulcanization, so that they are suitable for use in making, among other things, sealing joints between metal parts, or coatings for metal surfaces. They also ensure compatibility in mixtures of incompatible elastomers.

Copolymers produced by this new process contain 99.9 to 80%, and preferably 99.8 to 85% weight of non-polar groups derived from at least two mono-olefins containing 2 to 20 carbon atoms in their molecule, and possibly an unconjugated diene, and 0.1 to 20 %, and preferably 0.2 to 15 % weight of polar groups derived from at least one unsaturated lactam with the general formula given above.

In one preferred embodiment, the mono-olefins constituting non-polar groups with the unconjugated diene, if any, are alpha-olefins with the formula $R—CH = CH_2$, where R is hydrogen or an alkyl containing 1 to 18 carbon atoms, and particularly ethylene, combined with a higher alpha-olefin containing 3 to 8 carbon atoms, such as propylene of 1-butene.

In copolymers containing ethylene, the minimum ethylene content is not of critical importance, but the upper limit is 75 % of the weight of copolymer, to prevent polythene-type crystallinity. The proportion of the second mono-olefin, such as propylene or 1-butene, or of the second mono-olefin and unconjugated diene, can be from 5 to 75 % of the weight of copolymer, and the unconjugated diene content can be up to 20 % of the weight of copolymer. The content of polar groups is from 0.1 to 20 %, and preferably 0.2 to 15 %, of the weight of copolymer.

In this new process, the unsaturated lactams from which polar groups in the copolymer are derived are copolymerized with the mono-olefins and unconjugated dienes, if any, in the form of complexes with Lewis acids. A lewis acid is regarded as any compound acting as acceptor of an electron doublet, in this case the electron doublet of the basic nitrogen atom in the unsaturated lactam. Lewis acids that can be used to complex unsaturated nitrogen derivatives for this process include, among others, alkyl aluminum dihalides such as ethylaluminum dichloride and ethylaluminum dibromide, aluminum trihalides such as aluminum trichloride and aluminum tribromide; boron halides such as boron trichloride and boron trifluoride etherate; tin halides such as tin tetrachloride and tin tetrabromide, and nickel halides such as nickel dichloride. As a rule, the compound acting as Lewis acid for the unsaturated lactam is selected so that the complex it forms with the lactam has greater stability than the reaction products the lactam may form with the components of the coordination catalyst system used in copolymerization. The complex between the Lewis acid and unsaturated lactam can be preformed before being added to the polymerization mixture; in this case the lactam and Lewis acid are dissolved in an inert solvent, preferably the liquid used as the polymerization medium, which is kept at asuitable temperature, for example −80° to +80°C. The complex can also be formed in situ in the polymerization mixture, before or during polymerization. The molar proportion of Lewis acid used to form the complex must be at least equal to the stoichiometric quantity, and may be as much as four times this amount. The quantity is preferably such that the molar ratio of Lewis acid to unsaturated lactam is between 1 and 3.

Particularly suitable catalyst systems for the preparation of copolymers by this new process are formed by the combination or organic compounds of aluminum with titanium, vanadium, tungsten or zirconium derivatives, such as halides, oxyhalides, compounds in which at least one of the valencies of the transition metal is saturated by a heteroatom, particularly oxygen or nitrogen, linked to an organic group, such as acetyl acetonates, benzoyl acetonates and alcoholates.

In certain cases, it may be preferably to use a complex of the transition metal derivative with a ligand selected from aliphatic ethers such as diethylic and dipropylic ethers, diethoxyethane, cyclic ethers such as tetrahydrofurane, dioxane, thioethers, phosphines, arsines, tertiary amines such as trimethylamine, methyldiethylamine, heterocyclic nitrogen bases such as pyridine, quinoline, β-diketones, ketoesters, hydroxyaldehydes, aminoaldehydes and aminoalcohols.

One particularly recommended catalyst system contains an organo-aluminum compound with the formula $AlY_nCl_{(3-n)}$, where $n$ is a number equalling 1, 3/2, 2 or 3, and Y is a lower alkyl radical such as ethyl, propyl, isobutyl or hexyl, combined with a titanium halide such as $TiCl_4$, or a vanadium halide or oxyhalide such as $VCl_4$ or $VOCl_3$, or vanadium acetylacetonate. These titanium or vanadium halides can be complexed by tetrahydrofurane, an aliphatic ether, tertiary amine, pyridine or quinoline.

The catalyst may be deposited on an organic or inorganic carrier, or chemically bonded to it.

The catalyst system may also contain a certain proportion of activator, such as an alkoxyalkyl halosulphide or halosulphate, such as ethoxyethyl chlorosulphide or chlorosulphate, a halosulphonyl thiophene such as di-2-4-(chlorosulphonyl) thiophene, or a dichloroarylphosphine such as dichlorophenylphosphine.

To form the catalyst system, the organometallic compound and transition metal compound may be mixed or left separate before being added to the polymerization mixture. Premixed catalyst may be added to the polymerization mixture continuously or intermittently.

The activator, if any, may be mixed with the catalyst before being added to the polymerization mixture. It can also be added directly to the mixture during polymerization, continuously or in fractions. In another method, the activator is first mixed with the transition metal compound.

The quantities of organometallic and transition metal compounds in the catalyst system are such that the ratio of the number of metal atoms in the organometallic compound to the number of transition metal atoms in the transition metal compound is between 1 and 50, and preferably between 2 and 30.

The quantity of activator can vary widely, such as from 0.5 to 25 moles of activator per transition metal atom, but the polymerization mixture must contain more organometallic compound, expressed in metal atoms, than activator molecules.

The inert liquid medium (namely a medium that will no affect the components of the catalyst system or the complex between the unsaturated nitrogen derivative and the Lewis acid), in which copolymerization takes place, is preferably an aliphatic, aromatic or cycloaliphatic hydrocarbon, such as heptane, toluene, hexane, cyclohexane or benzene, or mixtures of these solvents. Inert halogenated hydrocarbons can also be used, such as chloroform, chlorobenzene and tetrachloroethylene. Olefins themselves can act as a liquid polymerization medium, and copolymerization can be performed in the olefin or one of the olefins to be copolymerized, used in liquid form.

Recommended temperatures for polymerization are between −30° and +100°C, while pressures can range for example from 1 to 50 atmospheres, or even more.

All of the complexes between the unsaturated lactam and Lewis acid can be added to the polymerization mixture before the catalyst system is added, or during polymerization, continuously or intermittently. The proportion of complex in the polymerization mixture, compared with the proportion of organometallic derivatives in the catalyst system, is not of critical importance, and can be much greater.

Copolymerization can be performed continuously, in which case the inert liquid medium, olefins, complexed unsaturated nitrogen derivative, unconjugated diene if any, and catalyst system, are fed continuously into the reactor, at rates such that the length of time they remin in the reactor is sufficient to obtain the necessary concentration of copolymer in the reactive mixture.

During copolymerization, the reaction medium is deprived of free oxygen, as already known in the prior art, by a flow of inert gas, such as nitrogen, before polymerization begins.

The time required for copolymerization generally varies depending on operating conditions, and is usually between 20 minutes to 4 hours.

After copolymerization, the catalyst is destroyed by some method known in the prior art, such as by adding an alcohol to the reactive mixture. The copolymer is then separated from the solvent by coagulation with an alcohol, by stripping with steam, or by any other method for isolating a polymer from solutions containing it.

The invention is illustrated by the following examples, without being confined to them.

EXAMPLE 1

Copolymerization was performed in a cylindrical glass reactor with an inside diameter of 10 cm and a capacity of 2,000 milliliters. It was equipped with a stirring system, a dropping funnel to introduce the unsaturated lactam, two dropping funnels to inject the catalyst system, and gas inlet and outlet tubes. The reactor was submerged in a heat-controlled bath and its temperature was kept at 30°C throughout copolymerization.

The funnels on top of the reactor were swept out in order to establish a nitrogen atmosphere in them. 25 millimoles of a complex of N-vinylpyrrolidone and ethylaluminum dichloride, dissolved in 40 milliliters of benzene, prepared by mixing N-vinylpyrrolidone and ethylaluminum dichloride in a molar ratio of 1:1 in benzene at a temperature of approximately 10°C, were placed in the monomer-inlet funnel.

2 millimoles of vanadium tetrachloride in 40 milliliters of anhydrous heptane were placed in one of the dropping funnels for the catalyst system, and 16 millimoles of ethylaluminum sesquichloride ($\frac{1}{2}[(C_2H_5)_3Al_2Cl_3]$) in 40 milliliters of anhydrous heptane in the other.

880 milliliters of heptane, which had first been dried an degassed, were placed in the reactor, inside which a nitrogen atmosphere was maintained. The flow of nitrogen was stopped, and a mixture of ethylene and propylene, in a molar ratio of propylene to ethylene of 1.2, was fed through the gas-inlet tube. This mixture circulated at a rate of 100 normal liters an hour throughout copolymerization.

20 minutes after the gas mixture had begun to be fed in, the complexed vinylpyrrolidone and catalyst system components were injected drop by drop, each over a period of 40 minutes. Injection of the olefins continued for a further 10 minutes, after which copolymerization was halted by adding 50 milliliters of ethanol. The solution was then poured into ethanol to precipitate the copolymer, which was next washed in ethanol and dried in a drier at reduced pressure.

This produced 36 gr of a solid substance with the appearance of an unvulcanized elastomer, amorphous to X-rays, and with a reduced viscosity, measured in decaline at 135°C, of 0.78.

After hot ethanol extraction, the terpolymer was analysed by the Kjeldahl method to determine its nitrogen content, while its propylene content was measured by infrared analysis.

The terpolymer contained 0.44 % weight of nitrogen, corresponding to 3.5 % vinylpyrrolidone-derived groups, 33.9 propylene-derived groups and 62.7 % ethylene-derived groups.

If the test is repeated under the same conditions, but using vinylpyrrolidone in a non-complexed form, no copolymer forms.

EXAMPLE 2

1.3 liters of dried, degassed heptane were placed in a cylindrical glass reactor with a capacity of 1,500 milliliters, heat-controlled at 30°C, equipped with an anchor stirrer and with apertures at the base to introduce the catalyst system components, unsaturated lactam, reaction solvent and olefinic monomers, and at the top an outlet for the reaction solution and residual gas; the introduction of heptane is done after first sweeping out the reactor with $N_2$ A gas mixture of ethylene and propylene, in a molar ratio of propylene to ethylene of 1:2, was then injected into the reactor for 20 minutes, at a rate of 100 normal liters an hour. 1.2 millimoles of $VCl_4$, 8.4 millimoles of ethylaluminum sesquichloride, each diluted in heptane, and 20 millimoles of N-vinylpyrrolidone complexed by 20 millimoles of ethylaluminum dichloride diluted in benzene, were fed into the reactor, over a period of 40 minutes, using measuring pumps. The olefins were injected continuously. After 40 minutes, the total volume of solution was 1.5 liters.

While injection of the olefins continued, fresh heptane, and 2.4 millimoles of $VCl_4$ and 16.8 millimoles of ethylaluminum sesquichloride, each diluted in heptane, and 40 millimoles of N-vinylpyrrolidone, complexed by 40 millimoles of ethylaluminum dichloride, and diluted in benzene, were fed into the base of the reactor, the quantity being such that the total volume of solvent injected, including the solvent used to dilute the components of the catalyst system and complexed monomer, was 1.45 liters in 80 minutes, while the copolymer solution was collected continuously through the upper reactor outlet, at the rate of 1.5 liters in 80 minutes. On leaving the reactor, the copolymer solution was mixed with an antioxidant, then washed continuously with an aqueous acid solution to coagulate the copolymer. After three successive 80-minute periods, the total quantity of solution collected was 6 liters, and its copolymer concentration was 7.2 % in weight.

The resulting terpolymer had the appearance of an unvulcanized elastomer, with reduced viscosity, measured in decaline at 135°C, of 0.98.

This terpolymer contained 0.24 % weight of nitrogen, namely 1.9 % N-vinylpyrrolidone-derived groups, 38 % propylene-derived groups, and 60.1 % ethylene-derived groups.

A comparative test was done, under the same conditions but without complexing the N-vinylpyrrolidone. No polymer was obtained.

EXAMPLE 3

The same conditions applied as in Example 2, except that the N-vinylpyrrolidone and ethylaluminum dichloride complex were replaced by the same molar quanity of a complex obtained by mixing N-vinylcaprolactam and ethylaluminum dichloride, in a molar ration of 1:1, in benzene at 10°C, and that the catalysts and complex were added over a period of 80 minutes.

This produced 50.5 gr of a terpolymer amorphous in X-rays, with the appearance of an unvulcanized elastomer, and with reduced viscosity, measured in decaline at 135°C, of 0.903.

This terpolymer contained 0.3 % weight of nitrogen, namely 3 % vinylcaprolactam-derived groups, 36 % propylene-derived groups, and 61 % ethylene-derived groups.

When the test was repeated without complexing the N-vinylcaprolactam, no polymer was obtained.

EXAMPLE 4

Copolymerization was performed in a six-liter reactor similar to the one in Example 1, heat-controlled at 20°C.

The funnels on top of the reactor were swept out with nitrogen to establish a nitrogen atmosphere in them. 150 millimoles of the N-vinylpyrrolidone and ethylaluminum dichloride complex described in Example 1, diluted in 160 milliliters of benzene, were placed in the monomer-inlet funnel.

8 millimoles of $VOCl_3$ in 120 milliliters of anhydrous heptane were placed in one of the dropping tunnels for the catalyst system, and 40 millimoles of diethylaluminum chloride in the same amount of anhydrous heptane in the other.

3.6 liters of heptane, which had first been dried and degassed, were placed in the reactor, inside which a nitrogen atmosphere was maintained. The flow of nitrogen was stopped, and a mixture of ethylene and propylene, in a molar ratio of propylene to ethylene of 1.2, was fed in through the gas-inlet tube. This mixture circulated at the rate of 100 normal liters an hour throughout copolymerization. 20 minutes after the gas mixture had begun to be fed in, the complexed lactam and the components of the catalyst system were injected drop by drop, each over a period of 120 minutes. Injection of the olefins continued for a further 10 minutes.

When the reaction was over, an antioxidant was added to the reactive mixture, and it was treated with water containing 6 % weight of citric acid to wash the polymer.

The reaction produced 160 gr of a terpolymer with the appearance of an unvulcanized elastomer, amorphous in X-rays, and with a reduced viscosity, measured in tetraline at 135°C, of 0.760.

The terpolymer contained 0.45 % weight of nitrogen, corresponding to 2 % vinylpyrrolidone-derived groups, 38 % propylene-derived groups and 58.4 % ethylene-derived groups.

The terpolymer was then subjected to a vulcanization test. For this purpose, a mixture containing 100 parts weight of terpolymer, 70 parts weight of colloidal silica, and 12 parts weight of commercial peroxide containing 40 % bis(t-butylperoxyisopropyl) benzene were mixed in a roller mixer, and then vulcanized by heating in a press to 165°C for 35 minutes.

The vulcanized product showed a tensile strength of 120 kg/cm2, and breaking elongation of 450 %.

The adherence of this vulcanized mixture (referred to as MP) on an aluminum surface, as well as the adherence of a similar mixture (referred to as MC), prepared from the terpolymer described in Example 3, and using another vulcanized mixture (referred to as MT) as control sample, prepared under the same conditions from an ethylene and propylene copolymer marketed under the name "Dutral" by the Italian firm Montedison SpA.

This was measured on samples, prepared by hot-pressing (at 185°C) each of the mixtures between 2 aluminum foils 30 mm wide, which had previously been cleaned with trichlorethylene and treated with a sulphochromic mixture, so as to provide at one end of the sample a part free of elastomer. Hot pressing was continued for a period of time referred to below as $t_{95}$, corresponding to the time needed to reach 95 % of the optimum crosslinking couple of the mixture on a Monsanto rheometer. After the hot-pressing phase, the assembly was cooled down, and the samples were subjected to a peeling test to determine the adhesive force.

This test was done using a dynamometer comprising a fixed upper part provided with two rotationally mobile horizontal bars, set slightly apart, and a lower part equipped with jaws and vertically mobile when subjected to a measurable force.

The sample was placed vertically between two bars, the end free of vulcanized mixture upwards, and the parts of the foils left free were each bent back over the corresponding bar, then gripped in the jaws of the lower part.

This lower part was then moved downwards at a speed of 15 mm per minute, in order to tear the foil away from the elastomer, and the force needed to do this was measured.

This force, expressed in kg per cm width of foil, is known as the adhesive force, and it defines the adherence of the elastomer to the aluminum surface.

The results obtained in the test are shown in Table I below.

Table I

| Mixture | $t_{95}$ (mins.) | Adhesive force | Remarks |
| --- | --- | --- | --- |
| MT | 7 | 2.6 | very uneven adherence in points |
| MP | 5.5 | 3.2 | homogeneous adherence |
| MC | 6 | 3.1 | fairly even adherence |

Comparison of these results shows that the addition to the chains of an amorphous ethylene and propylene copolymer of N-vinylpyrrolidone-derived groups (MP) or N-vinylcaprolactam-derived groups (MC) brings about a qualitative and quantitative improvement in the adherence of vulcanized copolymer to metal substrates, particularly aluminum.

EXAMPLE 5

The same conditions applied as in Example 3, except that the N-vinylcaprolactam and ethylaluminum dichloride complex was replaced by a complex of N-vinyl-7-ethyl caprolactam and ethylaluminum dichloride prepared in the same way.

This produced 48 gr of a terpolymer amorphous in X-rays and with the appearance of a vulcanized elastomer.

This terpolymer contained 0.27 % weight of nitrogen, namely 3.2 % N-vinyl-7-ethyl caprolactam-derived groups, 35 % propylene-derived groups and 61.8 % ethylene-derived groups.

EXAMPLE 6

The same method was adopted as in Example 1, except that the N-vinylpyrrolidone and ethylaluminum dichloride complex was replaced by a complex of N-vinylthiopyrrolidone and ethylaluminum dichloride prepared in the same way.

This produced 30 gr of a terpolymer amorphous in X-rays and containing 0.29 % weight of nitrogen, namely 2.6 % vinylthiopyrrolidone-derived groups, 35 % propylene-derived groups and 62.4 % ethylene-derived groups.

EXAMPLE 7

Two copolymerization tests were performed under the same conditions as those described in Example 3, except that the N-vinylcaprolactam was replaced by N-allylcaprolactam (test 1) and by N-vinylthiocaprolactam (test 2).

Test 1 produced 46gr of a terpolymer with the appearance of an unvulcanized elastomer, amorphous in X-rays and containing 0.25 % weight of nitrogen, namely 2.7 % N-allylcaprolactam-derived groups, 34 % propylene-derived groups and 63.3 % ethylene-derived groups.

Test 2 produced 40 gr of a terpolymer amorphous in X-rays, containing 0.21 % nitrogen, namely 2.3 % N-vinylthiocaprolactam-derived groups, 35 % propylene-derived groups and 62.7 % ethylene-derived groups.

EXAMPLE 8

A reactor similar to the one described in Example 1 was used, and the temperature was kept at 20°C throughout copolymerization.

The funnels on top of the reactor were drained and a nitrogen atmosphere established in them. 50 millimoles of a complex of N-vinylpyrrolidone and ethylaluminum dichloride in 80 milliliters of benzene, prepared as described in Example 1, were placed in the monomer-inlet funnel.

750 milliliters of anhydrous benzene were placed in one of the funnels for the catalyst system. The flow of nitrogen was stopped, and a mixture of ethylene and 1-butene, in the molar ratio of 1-butene to ethylene of 2, was injected through the gas-inlet tube. This mixture circulated at a rate of 100 normal liters an hour throughout copolymerization.

After 20 minutes' saturation of the solvent by the gaseous mixture, the complexed N-pyrrolidone and catalyst system components were fed in continuously, each over a period of 60 minutes.

30 minutes after addition of the catalysts, polymerization was halted by adding 20 milliliters of ethanol.

The contents of the reactor were then poured into ethanol to coagulate the polymer, which was then washed in ethanol and in hot water, and dried in a drier at approximately 50°C.

This produced 42 gr of a terpolymer amorphous in X-rays, and containing 0.3 % weight of nitrogen, namely 2.4 % N-vinylpyrrolidone-derived groups, 41 % butene-derived groups and 56.6 % ethylene-derived groups.

EXAMPLE 9

3.6 liters of anhydrous benzene were added to a 6-liter reactor of the type described in Example 1, heat-controlled to 30°C, with a nitrogen atmosphere inside, and with a stirring system operating. The flow of nitrogen was stopped, and the benzene was saturated with a mixture of ethylene and propylene in a molar ratio of propylene to ethylene of 1.2. This mixture circulated at the rate of 100 normal liters an hour.

After saturation of the benzene, and without interrupting the addition of the olefins, 200 millimoles of 5-ethylidene 2-norbornene, 200 millimoles of an N-vinylcaprolactam and ethylaluminum dichloride complex, prepared as described in Example 1, together with 8 millimoles of $VOCl_3$ and 40 millimoles of ethylaluminum sesquichloride, were added continuously to the reactor, over a period of 150 minutes.

All the non-gaseous compounds added to the reactor were diluted in benzene, so that the total volume of benzene in the reactor was 4 liters.

When the reaction was over, an antioxidant solution was added to the contents of the reactor, and the catalysts were deactivated with ethanol. The polymer that had formed was collected by stripping away with vapour of the volatile components of the solution of polymer in benzene.

This produced 210 gr of tetrapolymer, amorphous in X-rays, and with the appearance of an unvulcanized elastomer. The viscosimetric molecular mass, based on measurement of reduced viscosity of the polymer in tetraline at 135°C, was 78,000.

This tetrapolymer contained 5 % weight of ethylidene norbornene-derived groups, as well as 0.42 % nitrogen, corresponding to 4 % N-vinylcaprolactam-derived groups, 40 % propylene-derived groups and 51 % ethylene-derived groups.

EXAMPLE 10

A 1,000 milliliter reactor of the same type as described in Example 1 was used, with an additional dropping funnel for the injection of a diene. The reactor was submerged in a heat-controlled bath, and its temperature kept at 0°C.

30 millimoles of cicyclopentadiene, diluted in 60 milliliters of heptane, were placed in the diene-inlet funnel, and 50 millimoles of the N-vinylpyrrylidone and ethylaluminum dichloride complex described in Example 1, diluted in 60 milliters of benzene, were placed in the lactam-inlet funnel. 4 millimoles of $VOCl_3$ were placed in one of the catalyst inlet funnels, and 60 millimoles of ethylaluminum sesquichloride in the other, each diluted in 60 milliliters of heptane.

630 milliliters of anhydrous heptane were placed in the reactor, inside which a nitrogen atmosphere was maintained. The flow of nitrogen was stopped, and a mixture of ethylene and propylene, in a molar ration of propylene to ethylene of 2, was fed in through the gas-inlet tube. This mixture circulated at a rate of 100 normal liters an hour.

30 minutes after the gas mixture had begun to be fed in, the molar ratio of propylene to ethylene was changed to 1 without altering the overall flow-rate, and the dicyclopentadiene, complexed lactam, and each of the catalyst system components were added drop by drop, over a period of 60 minutes.

Polymerization was then halted, and the polymer separated from the reactive mixture, purified and dried, as described in Example 1.

This produced 120 gr of a substance amorphous in X-rays, and with the appearance of an unvulcanized elastomer, containing 50 % weight of ethylene, 43 % propylene, 0.4 % nitrogen, namely 3.2 % N-vinylpyrrolidone, and 4 non-aromatic double bonds per 1,000 carbon atoms, corresponding to 3.8 % weight of dicyclopentadiene.

The tetrapolymer was then vulcanized by mixing 100 parts weight of it in a roller mixer with 50 parts weight of HAF carbon black, 5 parts zinc oxide, 2 parts sulphur, 1 part mercaptobenzothiazole and 2 parts tetramethylthiurame disulphide.

This mixture was heated to 155°C for 1 hour, in a press.

The vulcanized product had a tensile strength of 140 kg/cm2 and elongation at break of 320 %.

EXAMPLE 11

The same conditions applied as in Example 3, except that the N-vinylcaprolactam and ethylaluminum dichloride complex was replaced by a complex obtained by reaction in toluene at 0°C of N-vinylcaprolactam and aluminum trichloride, in a molar ratio of 1:1, ant that toluene was used as reaction medium for polymerization.

This produced 30 gr of a terpolymer amorphous in X-rays, and with a reduced viscosity, measured in decaline at 135°C, of 0.9. It contained 0.2 % weight of nitrogen, namely approximately 2 % N-vinylcaprolactam-derived groups, 63 % ethylene-derived groups and 35 % propylene-derived groups.

EXAMPLE 12

The same operating procedure was performed as in Example 11, except that the N-vinylcaprolactam and aluminum trichloride complex was replaced by a complex of N-vinylcaprolactam and boron trifluoride etherate (BF$_3${(C$_2$H$_5$)$_2$O } ), prepared in the same way.

This produced 32 gr of a terpolymer with the appearance of an unvulcanized elastomer and amorphous in X-rays.

It contained 0.24 % weight of nitrogen, namely approximately 2.4 % of N-vinylcaprolactam-derived groups, 41.6 % propylene-derived groups and 56 % ethylene-derived groups.

What is claimed is:

1. A process for the preparation of substantially linear amorphous, random copolymers of mono-olefins, or mono-olefins and unconjugated dienes, with unsaturated lactams of the general formula

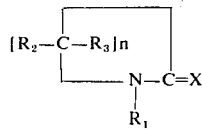

where R$_1$ is a monovalent alkenyl radical containing 2 to 8 carbon atoms, R$_2$ and R$_3$, which are identical or different, represent hydrogen or a monovalent hydrocarbon radical, free of ethylenic unsaturation and containing 1 to 8 carbon atoms, X represents oxygen or sulphur, and n is an integer of from 3 to 14 representing the number of repeating units

in the lactam ring so that the number of carbon atoms in the ring is equal to ($n = 1$) comprising contacting at least 2 mono-olefins containing from 2 to 20 carbon atoms in their molecules or at least 2 such mono-olefins and an unconjugated diene, in an inert liquid medium at a temperature of between −80°C and +150°C, with at least one of said unsaturated lactams, in the form of a complex formed with a Lewis acid, in at least stoichiometric amounts, in the presence of a catalytically effective amount of a catalyst system formed by the combination of an organometallic compound of at least one metal in columns I, II, or III of the periodic table of elements with a compound of a transition metal in columns IV to VIII of the periodic table, at a ratio of the number of atoms of the first metal to the number of atoms of the second metal of between 1 and 50, to obtain said copolymer.

2. A process as defined in claim 1, in which the monoolefins have the general formula R—CH = CH$_2$, where R represents one of a pair comprising hydrogen and an alkyl radical containing 1 to 18 carbon atoms.

3. A process as defined in claim 2, in which the olefins are ethylene combined with an alpha-olefin containing 3 to 8 carbon atoms.

4. A process as defined in claim 3 in which the alpha-olefin is one of a pair comprising propylene or 1-butene.

5. A process as defined in claim 1 in which an unconjugated diene is included in the polymerization mixture, this diene being selected from the group consisting of 1,4-hexadiene, 2-methyl1,4-pentadiene, 1,4-cycloheptadiene, 1,5-cyclooctadiene, 4,7,8,9tetrahydroindene, [3,2,0]-bicyclo 2,6-heptadiene, dicyclopentadiene and 5-alkylidene 2-norbornenes.

6. A process as defined in claim 1 in which the N-unsaturated lactams contain 4 to 13 nuclear carbon atoms or nuclear carbon atoms with monovalent hydrocarbon substitutions selected from the group consisting of alkyl radicals containing 1 to 6 carbon atoms and phenyl.

7. A process as defined in claim 6, in which the N-unsaturated lactams are selected from the group consisting of N-vinylpyrrolidone, N-vinylcaprolactam, N-vinyl-7-ethyl caprolactam, N-vinylthiopyrrolidone, N-vinylthiocaprolactam and N-allylcaprolactam.

8. A process as defined in claim 1, in which the Lewis acids used to complex the unsaturated lactam are selected from the group consisting of alkyl aluminum dihalides, aluminum trihalides, boron halides, tin halides and nickel halides.

9. A process as defined in claim 8 in which the Lewis acids are selected from the group consisting of alkyl aluminum dichlorides, aluminum trichloride and boron trifluoride.

10. A process as defined in claim 9 in which the alkyl aluminum dichloride is ethylaluminum dichloride.

11. A process as defined in claim 1, in which the catalyst system is formed by the combination of one of a pair comprising an organoaluminum and a halogenated organoaluminum compound and one of a pair comprising vanadium halide and oxyhalide.

12. A process as defined in claim 11 in which the vanadium halide and oxyhalide are complexed by an organic ligand.

13. A process as defined in claim 1 in which the inert liquid medium in which copolymerization takes place is a member of the group consisting of aliphatic, aromatic and cycloaliphatic hydrocarbons and their halogenated derivatives.

14. A process as defined in claim 1, in which the polymerization temperature is between −30° and +100°C.

15. A substantially linear, amorphous, random copolymer consisting of 99.9 to 80% weight of non-polar groups having at least 2 mono-olefins containing 2 to 20 carbon atoms in their molecules or at least 2 such mono-olefins and an unconjugated diene, and 0.1 to 20% polar groups having at least 1 unsaturated lactam of the general formula

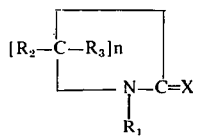

where $R_1$ is a monovalent alkenyl radical containing 2 to 8 carbon atoms, $R_2$ and $R_3$, which are identical or different, represent hydrogen or a monovalent hydrocarbon radical free of ethylenic unsaturation and containing 1 to 8 carbon atoms, X represents oxygen or sulphur, and n is an integer of from 3 to 14 representing the number of repeating units

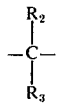

in the lactam ring so that the number of carbon atoms in the ring is equal to $(n + 1)$.

16. A copolymer as defined in claim 15, in which the unsaturated lactams contain from 4 to 13 nuclear carbon atoms or such nuclear carbon atoms bearing monovalent hydrocarbon substituents selected from the group consisting of alkyl containing 1 to 6 carbon atoms and phenyl.

17. A copolymer as defined in claim 16 in which the unsaturated lactams are selected from the group consisting of N-vinylpyrrolidone, N-vinylcaprolactam, N-vinyl-7-methyl caprolactam, N-vinylthiopyrrolidone, N-vinylthiocaprolactam and N-allylcaprolactam.

18. A copolymer as defined in claim 15 in which the non-polar groups have at least 2 olefins with the formula $R-CH=CH_2$, where R represents one of a pair comprising hydrogen and an alkyl radical containing 1 to 18 carbon atoms.

19. A copolymer as defined in claim 18 in which the non-polar groups are derived from ethylene and an alpha-olefin containing 3 to 8 carbon atoms.

20. A copolymer as defined in claim 19, in which the non-polar groups are one of two paris comprising ethylene and propylene, and ethylene and 1-butene, and in which the proportion of propylene or 1-butene derived groups can vary between 5 and 75% of the weight of copolymer, and the ethylene content is not more than 75% of the weight of copolymer.

21. A copolymer as defined in claim 15, in which the non-polar groups also contain units of an unconjugated diene, the proportion of which is not more than 20% of the weight of copolymer.

22. A copolymer as defined in claim 21, in which the unconjugated diene is selected from the group consisting of dicyclopentadiene, 5-alkylidene-2-norbornenes 1,4-hexadiene 2-methyl-1,4-pentadiene, 1,4-cycloheptadiene, 1,5-cyclooctadiene, 4,7,8,9-tetrahydroindene, and [3,2,0]bicyclo 2,6-heptadiene.

23. A copolymer as defined in claim 15, in which the non-polar groups represent 99.8 to 85% of the weight of copolymer, while polar groups represent 0.2 to 15% of the weight of copolymer.

24. Elastomers obtained by vulcanizing a copolymer as defined in claim 15.

25. Elastomers as defined in claim 24, vulcanized on a substrate.

26. Elastomers as defined in claim 25, in which the substrate is a metal surface.

* * * * *

UNITED STATES PATENT OFFICE
CERTIFICATE OF CORRECTION

Patent No. 3,939,129  Dated February 17, 1976

Inventor(s) Gilbert Marie

It is certified that error appears in the above-identified patent and that said Letters Patent are hereby corrected as shown below:

Column 3, line 40, "lewis" should read -- Lewis --.

Column 4, line 12, "preferably" should read -- preferable --.

Column 5, line 21, "remin" should read -- remain --.

Column 7, line 15, "quanity" should read -- quantity --.

Column 12, line 16, "(n=1)" should read -- (n+1) --.

Column 14, line 23, "paris" should read -- pairs --.

Signed and Sealed this

Fifth Day of October 1976

[SEAL]

Attest:

RUTH C. MASON
Attesting Officer

C. MARSHALL DANN
Commissioner of Patents and Trademarks